Oct. 14, 1969  N. H. JENSEN ETAL  3,471,933
GAGING MACHINE

Filed Nov. 4, 1966  4 Sheets-Sheet 1

INVENTORS
NIELS HENRIK JENSEN
GILBERT PAINE CARDWELL
BY

Mason, Mason & Albright
ATTORNEYS

Oct. 14, 1969  N. H. JENSEN ET AL  3,471,933
GAGING MACHINE

Filed Nov. 4, 1966  4 Sheets-Sheet 2

INVENTORS
NIELS HENRIK JENSEN
GILBERT PAINE CARDWELL
BY
Mason, Mason & Albright
ATTORNEYS Oct. 14, 1969  N. H. JENSEN ETAL  3,471,933

GAGING MACHINE

Filed Nov. 4, 1966

INVENTORS
NIELS HENRIK JENSEN
GILBERT PAINE CALDWELL
BY
Mason, Mason & Albright
ATTORNEYS

… … …

United States Patent Office 3,471,933
Patented Oct. 14, 1969

3,471,933
GAGING MACHINE
Niels H. Jensen, Glenmoore, and Gilbert P. Cardwell, Parkesburg, Pa., assignors to Lukens Steel Company, Coatesville, Pa., a corporation of Pennsylvania
Filed Nov. 4, 1966, Ser. No. 592,117
Int. Cl. G01b 5/00
U.S. Cl. 33—147   11 Claims

ABSTRACT OF THE DISCLOSURE

The gaging device disclosed herein comprises a yoke with a measuring mechanism which yoke is mounted on a carriage movable transverse to the direction of intended travel of a conveyed plate to provide an improved gaging machine capable of measuring and recording the profile of a hot or a cold steel plate and to provide a measuring device which will automatically move transverse to the intended direction of travel of a conveyed plate, automatically scan the width of the plate and return to initial position.

---

The present invention relates to a gaging machine for measuring the profile of a plate. More particularly, the gaging device disclosed herein comprises a yoke with a measuring mechanism which yoke is mounted on a carriage movable transverse to the direction of intended travel of a conveyed plate.

It is an object of the present invention to provide an improved gaging machine capable of measuring and recording the profile of a hot or a cold steel plate. It is a further object of the present invention to provide a measuring device which will automatically move transverse to the intended direction of travel of a conveyed plate, automatically scan the width of the plate and return to initial position. These and other objects will be apparent from the following.

Figure 1:
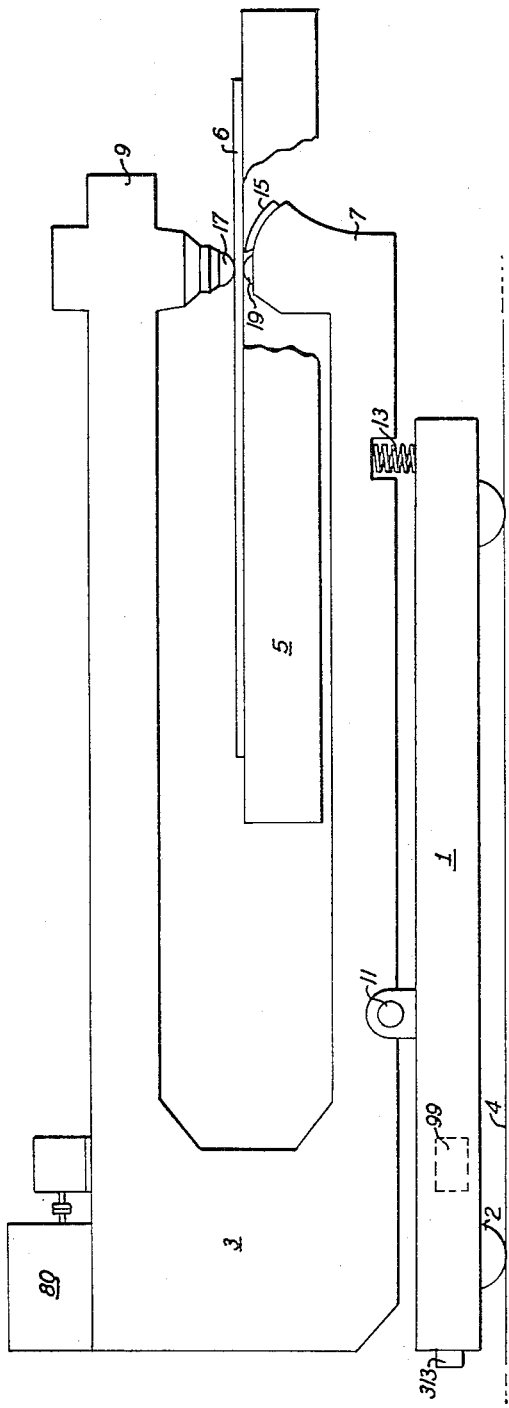
FIG. 1 is a side elevation of the gaging machine.

In FIG. 1, the machine comprises a carriage 1 mounted on wheels 2 which ride on tracks 4. A tiltable yoke 3, with an open end to straddle table roll assembly 5, is mounted on carriage 1 to move transversely to intended direction of travel of a plate 6 conveyed along the table roll assembly. Yoke 3 is tiltable on carriage 1 about a trunnion or pivot 11 and a balancing spring 13 is used to correctly position the yoke during measuring if the plate is not flat.

Figure 10:
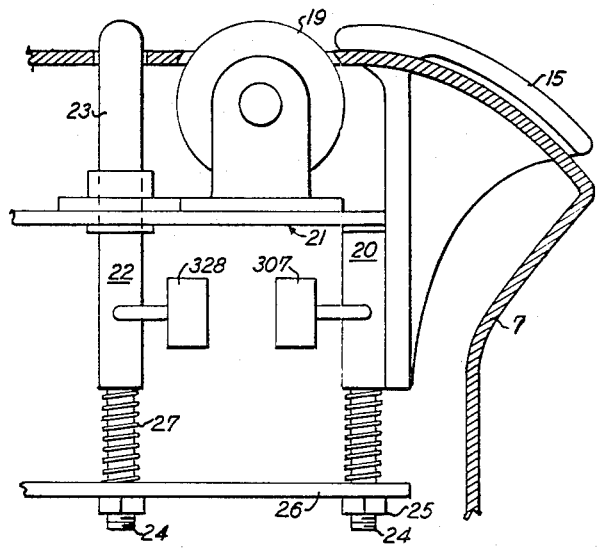
FIG. 10 is a side elevation view of the details of the lower measuring roll and guide shoe.

A guide shoe 15 is supported on the lower arm 7 of the yoke 3 and a measuring roll 19 is fixed to arm 7 adjacent guide shoe 15. The upper arm 9 of the yoke 3 includes a vertically displaceable measuring roll 17. Referring now to FIG. 10, it will be seen that shoe 15 has a generally sloping forward edge to receive and guide the plate to the lower measuring roll 19. Guide shoe 15 is secured to a bracket assembly 21 which is depressable to a limited extent, responsive to the weight of a plate being engaged by the guide shoe. The bracket assembly includes a pair of bolts 24 secured to one another and to shoe 15 by plate 26 and nuts 25. The bolts 24 each have a sleeve which is urged upwardly by a spring 27. Shoe 15 is connected to sleeve 20 so that depressing or raising the shoe moves sleeve 20 and actuates switch 307. Sleeve 22 is connected to a plug 23 and movement of plug 23 moves sleeve 22 to actuate switch 328. Springs 27 bias the sleeves to elevated positions.

Figure 7:
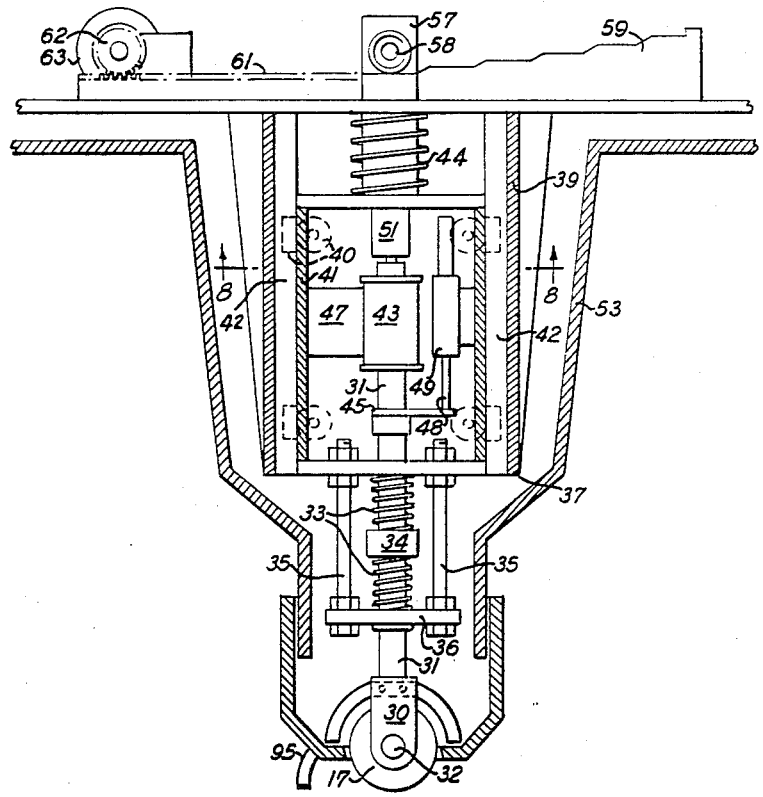
FIG. 7 is a section view of the upper yoke arm showing details of the measuring device.

In FIG. 7 upper measuring roll 17 is journalled to the fork end 30 of shaft 31 with a pin 32. Shaft 31 extends upwardly to be received in a spring balance which comprises a pair of compression springs 33 which bear on an adjustable stop nut 34. A pair of bolts 35 connect the lower portion of slide 41 with a plate 36 and the upper and lower springs 33 bear on the lower portion of the housing and plate 36 to provide support for shaft 31.

Figure 8:
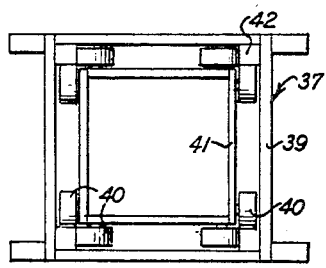
FIG. 8 is a plan view taken along the lines 8—8 of FIG. 7.

Housing 37 includes an outer frame 39 with corner guide posts 42 and an inner slide 41 having rollers 40 which bear on the guide posts 42 (FIG. 8) so that no deviation of the slide 41 from vertical movement is possible. Within slide 41, shaft 31 extends through solenoid cell 43 which is mounted on bracket 47, to raise shaft 31 together with measuring roll 17. Mounted on shaft 31 is a further bracket 45 which extends to one side to provide support for a rod 48. Rod 48 comprises the inner core of a differential transformer 49 with its outer core being fastened to slide 41. Vertical movement of the roll 17 and shaft 31 relative to slide 41 moves the inner core 48 vertically relative to the transformer 49 to provide the means for measuring the profile of the plate. An air brake 51 is associated with the shaft 31 and a heat shield 53 surrounds the entire housing 37.

A bar 57 is secured to slide 41 and a compression spring 44 is mounted on the bar 57 to bear on the upper surface of slide 41 and the under surface of a fixed structural member in the upper arm 9 of yoke 3. The bar 57 is provided with a roller bearing 58 which rides along a slip wedge 59. Movement of the wedge 59 by rack 61 and pinion 62 powered by motor 63, raises bar 57 as well as slide 41, shaft 31 and roll 17. Thus it will be understood that the upper measuring roll 17 can be raised to accommodate any of a variety of plate thicknesses.

Figure 2:
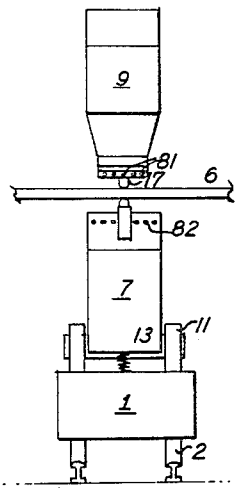
FIG. 2 is a front elevation of the gaging machine.
Figure 9:
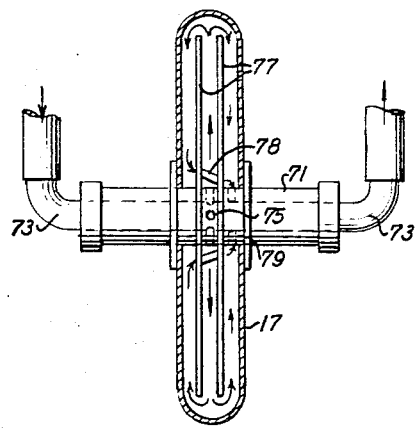
FIG. 9 is a top plan sectional view of one of the measuring rolls.

Each measuring roll is preferably water or air cooled. As seen in FIG. 9, roll 17 is rotatably mounted on a bearing 71 and bearing 71 is secured to hollow shaft 73 through which a coolant is circulated. The coolant enters roll 17 through entrance ports 75 located between a pair of discs 77. The coolant is thus circulated to the outer edge of the roller to exit ports 78 and 79. When hot plates are being rolled, the heat shield 53 and water cooled measuring rolls eliminate heat deformation of the yoke. Also a refrigerating unit 80 (FIG. 1) can be used to circulate cool air through the upper arm 9 and lower arm 7 each of which are provided with exits 81 and 82 (FIG. 2) at their forward ends.

Figure 4:
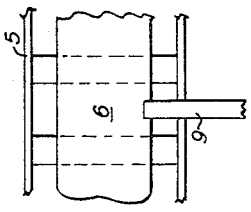
Figure 3:
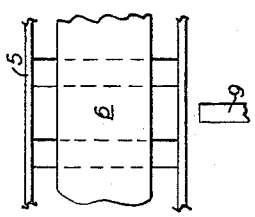

In operation, the gaging device is positioned as seen in FIG. 3 with measuring rolls 17 and 19 touching one another. Solenoid 43 is de-energized and the differential transformer 49 is at the "null" position. Also yoke 3 is tilted upwardly. The slip wedge 59 is moved to the appropriate gage and the solenoid 43 is energized to lift the top measuring roll 17. The carriage 1 is moved forwardly (FIG. 4) and as the guide shoe 15 touches the plate, the yoke 3 is brought to a substantially horizontal position. The plate depresses the guide shoe 15 to de-energize solenoid 43 and lower the measuring roll 17 until this roll engages the top surface of the plate. When the plate is being gaged, the measuring rolls with follow the contours of the plate's surfaces and record the measurements in the mill pulpit either by numbers or by plotting so that an accurate profile is obtained.

Figure 6:
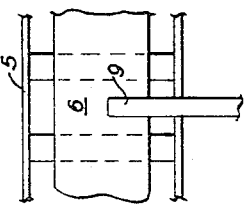
FIGS. 3, 4, 5 and 6 are schematic plan views showing the sequence of movements of the machine in one pass across the width of the plate being measured.
Figure 5:
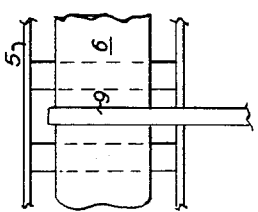

After the plate has been crossed by the yoke (FIG. 5), the guide shoe 15 will move up energizing solenoid 43 lifting measuring roll 17 and the carriage is moved back (FIG. 6) to starting position where limit switch 91 is closed and the machine is automatically reset for the next gaging step. Due to the fact that the machine resets itself after each cycle, any heat distortion of the frame will be compensated for and only the heat pickup from the plate during actual scanning will affect the measuring accuracy of the machine. The heat shield and water cooling the measuring rolls will minimize any inaccuracy due to heat. The temperature of the plate being processed is measured by an indicator 95 (FIG. 7) located adjacent roll 17.

Figure 11:
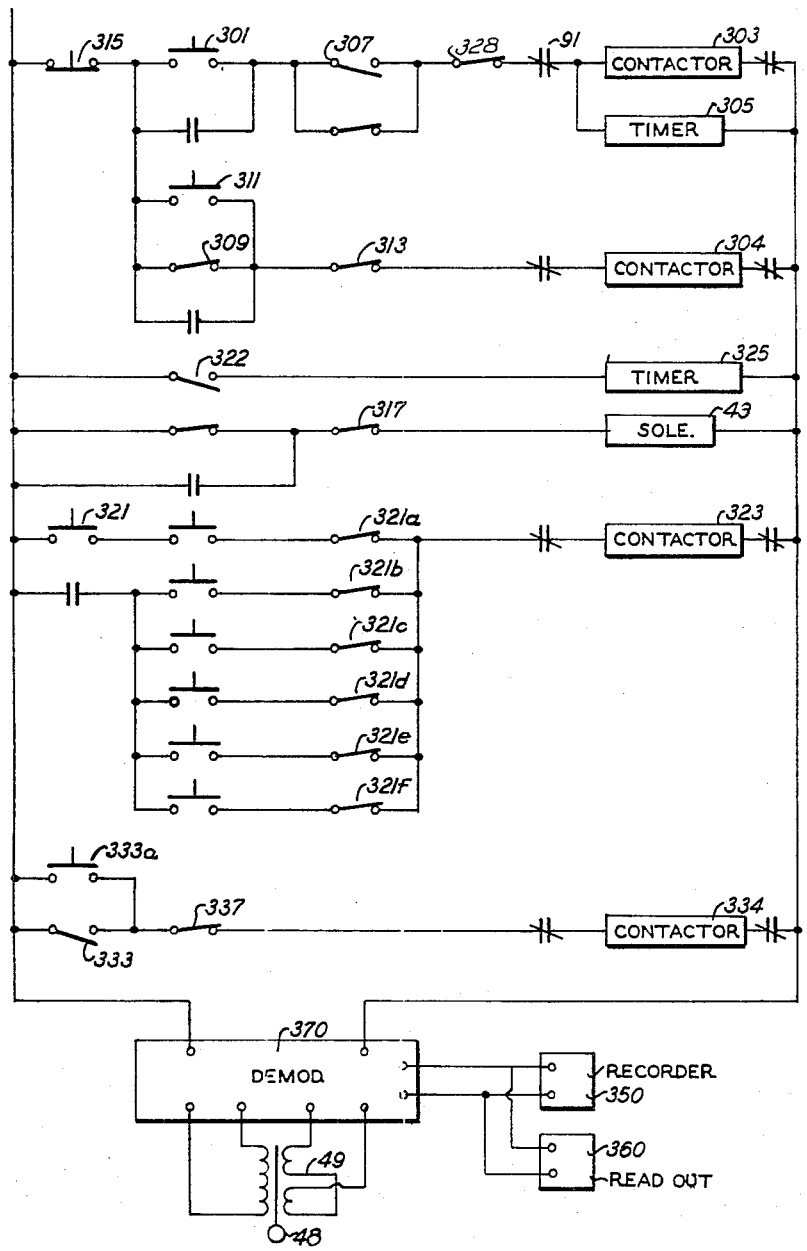
FIG. 11 shows a lay out of the electrical system of the machine.

In FIG. 11, the electrical layout is shown in which "start cycle" button 301 energizes forward contactor 303 to run motor 99 (FIG. 1) so that carriage 1 is moved forwardly (motor power circuit not shown). An interlock around 301 seals the circuit. Timer 305 provides a time delay contact which is set to open after guide shoe 15 contacts the plate closing limit switch 307. The carriage continues to move forwardly until guide shoe 15 reaches the extreme side of the plate (FIG. 5) whereupon limit switch 307 is opened and the forward motion of the carriage stops.

Limit switch 309 is closed when the guide shoe runs off the plate. A "reverse cycle" button 311 is provided for emergency and an interlock seals circuit through contactor 304. When the carriage is returned to starting position, limit switch 313 is opened and the motor 99 stops. As the scanning cycle is started, limit switch 317 closes when the carriage is moved towards and across the plate, whereupon solenoid 43 is energized to raise measuring roll 17 about four inches. Limit switch 322 is closed when guide shoe 15 contacts the plate. After a short time delay to permit roll 17 to be over plate, timer contact 325 opens to de-energize solenoid 43 permitting the measuring roll 17 to be lowered.

As the carriage 1 moves forwardly, the plate rides on the lower measuring roll 19 and upper measuring roll 17 follows the variations in the plate's gage, the vertical motion of roll 17 causing the armature 48 of the transformer 49 to move up and down. The output voltage which is proportional to the armature position is fed into a visual readout 360 and a recorder 350 to give the variation-plus or minus in desired gage. A profile of the plate can be obtained on the recorder 350 by obtaining voltage from a potentiometer geared to the drive for the carriage and using this voltage to plot the "X" coordinate on the recorder chart. The "Y" plot is obtained from the differential transformer and demodulator 370.

When the guide shoe reaches the edge of plate and motor 99 is reversed, the solenoid 43 is energized to lift roll 17 from the plate so that measurement only takes place when the carriage moves toward the path of the plate. When limit switch 313 is opened to stop the motor, switch 317 is also opened to de-energize the solenoid dropping roll 17 for "zero" check. Limit switch 333 closes to energize the "down" or decrease gage contactor 334 to run motor 63 in reverse until the wedge 59 reaches zero position whereupon switch 337 opens to start motor 63. A push button 333A can be manually used to stop motor 63 should a check be desired after switch 333 is opened. Also, plug 23 can actuate switch 328 if switch 307 fails to stop the forward motion of the carriage.

To gage a plate, a "gage select" button 321a, 321b, 321c, 321d, 321e or 321f corresponding to desired plate gage is pressed and the "gage set" button 321 is depressed. To energize the up (or increase gage) contactor 323, the "up" interlock closes around the "gage set" contact to seal the circuit. Motor 63 drives the wedge 59 to the left by the rack and pinion drive 61 and 62 until the cam limit switch contact, corresponding to the desired gage, opens. This de-energizes the "up" contactor 323 and stops motor 63. The wedge 59 is now set for desired plate gage, and an illuminated readout on 360 of that gage appears.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

What is claimed is:

1. A machine for gaging the profile of a plate comprising a movable carriage and a tiltable yoke mounted on said carriage, said yoke having an open end and opposing upper and lower measuring rolls vertically positioned relative to one another in said open end, said upper measuring roll being vertically displaceable, said upper measuring roll being connected to a vertically displaceable shaft, housing means associated with the upper arm of said yoke for sidably receiving and supporting said shaft, said housing means containing electrical measuring means for measuring the vertical movements of said shaft within said housing, said upper measuring roll and said shaft being vertically displaceable relative to said measuring means during operation of the machine due to the irregular surfaces of the plate being gaged, adjusting means for varying the vertical position of said housing, said shaft and upper measuring roll whereby plates of different gages can be profiled, a guide frame fastened to the upper arm of said yoke, and said housing comprising an inner slide within said frame, said inner slide being vertically slidable within said guide frame, said electrical measuring means being mounted on said slide, said upper measuring roll, said shaft and said electrical measuring means being in general vertical alignment.

2. The machine of claim 1 wherein said inner slide has rollers which bear on said guide frame to permit vertical movements of said slide relative to said guide frame.

3. The machine of claim 1 wherein said inner slide is connected to a vertically disposed adjusting rod which extends above said housing means, said adjusting rod being associated with a graded slip wedge whereby said slide and upper measuring roll can be raised and lowered.

4. The machine of claim 1 wherein said shaft is supported within said housing by a spring balance unit whereby limited vertical movements of said shaft relative to said housing take place during operation of the machine.

5. The machine of claim 1 wherein said lower measuring roll is fixed to the lower arm of said yoke and a guide shoe is mounted adjacent said lower measuring roll whereby said yoke is tiltable responsive to said guide shoe initially contacting the plate.

6. The machine of claim 5 wherein said guide shoe is spring loaded and depressible, switch means associated with said guide shoe in its depressed position to de-energize a solenoid coil whereby said upper measuring roll is lowered from an initial raised position to contact the plate.

7. The machine of claim 6 wherein said guide shoe is associated with a second switch means whereby when said solenoid is de-energized and said upper measuring roll is in contact with the plate, a motor means is activated to propel the carriage towards said plate.

8. The machine of claim 1 wherein a heat shield at least partly surrounds and protects said housing means.

9. The machine of claim 1 wherein said yoke is pivotally mounted on a trunnion on said carriage.

10. The machine of claim 1 wherein said carriage is provided with wheels which ride along a track transverse to the intended direction of travel of the plate.

11. A machine for gaging the profile of a plate comprising a motorized horizontally movable carriage and a yoke mounted on said carriage, said yoke having an open end and opposing upper and lower measuring rolls being vertically positioned relative to one another in said open end, said upper measuring roll being vertically displaceable, a guide shoe mounted on said yoke adjacent said lower measuring roll, means for moving said carriage forwardly whereby said guide shoe contacts a plate to be gaged, a solenoid connected with and actuated by said guide shoe, electrical measuring means associated with the vertical displacements of said upper measuring roll to indicate the profile of the plate being measured, first switch means connected to said solenoid to de-energize said solenoid to lower said upper measuring roll onto the plate and the start of a pass of said yoke across the plate when said guide shoe is moved into contact with the plate and to energize said solenoid raising said upper measuring roll after one pass has been made across the plate when said guide shoe is moved out of contact with said plate and second switch means actuated by contact with said plate at the end of one pass for energizing the motor moving said carriage whereby said carriage is returned to starting position.

References Cited

UNITED STATES PATENTS

| | | | |
|---|---|---|---|
| 2,083,677 | 6/1937 | Wilcox | 33—56 |
| 2,115,351 | 4/1938 | Terry et al. | |
| 2,177,009 | 10/1939 | Terry et al. | |
| 2,864,171 | 12/1958 | Edling et al. | |

FOREIGN PATENTS 151,614   1/1937   Austria.

SAMUEL S. MATTHEWS, Primary Examiner